United States Patent
Li et al.

(10) Patent No.: US 12,115,878 B2
(45) Date of Patent: Oct. 15, 2024

(54) METHOD, APPARATUS, DEVICE AND MEDIUM FOR ELECTRIC ENERGY TRANSMISSION

(71) Applicant: Contemporary Amperex Technology Co., Limited, Ningde (CN)

(72) Inventors: Zhanliang Li, Ningde (CN); Yu Yan, Ningde (CN); Zhimin Dan, Ningde (CN); Miaomiao Zhang, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 370 days.

(21) Appl. No.: 17/712,085

(22) Filed: Apr. 2, 2022

(65) Prior Publication Data
US 2023/0061401 A1 Mar. 2, 2023

Related U.S. Application Data

(63) Continuation of application No. PCT/CN2021/115809, filed on Aug. 31, 2021.

(51) Int. Cl.
*B60L 53/80* (2019.01)
*B60L 53/53* (2019.01)
(Continued)

(52) U.S. Cl.
CPC .............. *B60L 53/80* (2019.02); *B60L 53/53* (2019.02); *B60S 5/06* (2013.01); *H02J 3/322* (2020.01);
(Continued)

(58) Field of Classification Search
CPC .. H02J 7/0013; H02J 7/02; H02J 7/007; H02J 3/322; B60L 53/80; B60L 53/53; B60L 53/63; B60L 58/12; B60S 5/06
(Continued)

(56) References Cited

U.S. PATENT DOCUMENTS

2010/0017045 A1* 1/2010 Nesler .................... B60L 53/63
700/295
2015/0039391 A1* 2/2015 Hershkovitz ......... B60L 53/665
705/7.31
(Continued)

FOREIGN PATENT DOCUMENTS

CN 105098852 A 11/2015
CN 106130171 A 11/2016
(Continued)

OTHER PUBLICATIONS

The International search report for PCT Application No. PCT/CN2021/115809, dated May 31, 2022, 7 pages.
(Continued)

*Primary Examiner* — Edward Tso
*Assistant Examiner* — Aaron Piggush
(74) *Attorney, Agent, or Firm* — East IP P.C.

(57) ABSTRACT

The embodiments of the present application provide a method, apparatus, device, and medium for electric energy transmission. The method includes: determining a resource value of a unit of electric energy of a grid at a target time; under a condition that the resource value is greater than or equal to a first resource threshold, determining a number of available batteries in a battery swapping station and an ordered number of batteries in the battery swapping station within a target time period; and under a condition that the number of available batteries is greater than a number of reserved batteries, controlling a charging and discharging module to transmit electric energy of a first battery in the battery swapping station to the grid.

10 Claims, 4 Drawing Sheets

(51) Int. Cl.
  *B60S 5/06*   (2019.01)
  *H02J 3/32*   (2006.01)
  *H02J 7/00*   (2006.01)
  *B60L 53/63*   (2019.01)
  *B60L 58/12*   (2019.01)
  *H02J 7/02*   (2016.01)

(52) U.S. Cl.
  CPC ............ *H02J 7/0013* (2013.01); *H02J 7/007* (2013.01); *B60L 53/63* (2019.02); *B60L 58/12* (2019.02); *H02J 7/02* (2013.01)

(58) Field of Classification Search
  USPC .................................. 320/104, 107, 109, 153
  See application file for complete search history.

(56) References Cited

U.S. PATENT DOCUMENTS

| | | | |
|---|---|---|---|
| 2018/0244167 A1* | 8/2018 | Penilla | B60L 58/12 |
| 2022/0094165 A1* | 3/2022 | Ger | B60L 53/80 |

FOREIGN PATENT DOCUMENTS

| | | |
|---|---|---|
| CN | 108573317 A | 9/2018 |
| CN | 110556850 A | 12/2019 |
| CN | 111137168 A | 5/2020 |
| CN | 107194530 B | 9/2020 |
| CN | 111783359 A | 10/2020 |
| CN | 112821438 A | 5/2021 |
| CN | 213279178 U | 5/2021 |
| CN | 113043893 A | 6/2021 |
| JP | 2006202660 A | 8/2006 |
| JP | 2014011860 A | 1/2014 |
| JP | 2019033629 A | 2/2019 |
| JP | 2019145087 A | 8/2019 |
| JP | 2020077521 A | 5/2020 |
| TW | 202009507 A | 3/2020 |

OTHER PUBLICATIONS

Farzin Hossein et al., "Reliability Studies of Distribution Systems Integrated With Electric Vehicles Under Battery-Exchange Mode", IEEE Transactions on Power Delivery, Dec. 1, 2016, 10 pages.

Chang-Hua Zhang et al., "The adequacy model and analysis of swapping battery requirement for electrical vehicles", 2012 IEEE Power and Energy Society General Meeting, Jul. 22, 2012, 5 pages.

Xu Yijun et al., "Harmonic analysis of electric vehicle loadings on distribution system", 2014 IEEE International Conference on Control Science and Systems Engineering, Dec. 29, 2014, 6 pages.

The extended European search report for European Application No. 21865333.5, dated Mar. 20, 2023, 9 pages.

The First Office Action for JP Application No. 2021-560117, dated Oct. 23, 2023, 12 pages.

The First Office Action for KR Application No. 10-2021-7034979, dated Aug. 24, 2023, 8 pages.

\* cited by examiner

METHOD, APPARATUS, DEVICE AND MEDIUM FOR ELECTRIC ENERGY TRANSMISSION

CROSS REFERENCE TO RELATED APPLICATION

This application is a continuation of International Application No. PCT/CN2021/115809, filed on Aug. 31, 2021, the content of which is hereby incorporated by reference in its entirety.

TECHNICAL FIELD

The present application relates to the field of battery swapping technology, and in particular, to a method, apparatus, device and medium for electric energy transmission.

BACKGROUND

With the development of electric vehicles, the battery swapping technology for vehicles has become one of the development ways of battery technology. In the battery swapping technology, batteries in a vehicle entering a battery swapping station can be removed and replaced by batteries taken from the battery swapping station.

Currently, after the battery is placed into a charging compartment and fully charged by the charging compartment, the battery will stay in the charging compartment until it is taken out and swapped to the vehicle. Therefore, the utilization rate of electric energy of the batteries in the battery swapping station is generally low.

SUMMARY

The embodiments of the present application provide a method, apparatus, device and medium for electric energy transmission.

In a first aspect, the embodiments of the present application provide a method for electric energy transmission, comprising:
  determining a resource value of a unit of electric energy of a grid at a target time;
  under a condition that the resource value is greater than or equal to a first resource threshold, determining a number of available batteries in a battery swapping station and an ordered number of batteries in the battery swapping station within a target time period, wherein the target time period is a time period between the target time and a time when the resource value falls below the first resource threshold; and
  under a condition that the number of available batteries is greater than a number of reserved batteries, controlling a charging and discharging module to transmit electric energy of a first battery in the battery swapping station to the grid,
  wherein the number of reserved batteries is greater than or equal to the ordered number, and the first battery comprises one or more of batteries other than the reserved batteries in the battery swapping station.

In an optional embodiment, after the determining the number of available batteries in the battery swapping station and the ordered number of batteries in the battery swapping station within the target time period, the method further comprises:
  under a condition that the number of available batteries is less than the number of reserved batteries, controlling the charging and discharging module to transmit electric energy of the grid to a second battery other than the available batteries in the battery swapping station to modulate the second battery as an available battery by the electric energy of the grid, so that the number of available batteries after modulation is greater than the number of reserved batteries.

In an optional embodiment, after the determining the number of available batteries in the battery swapping station, the method further comprises:
  under a condition that the number of available batteries is less than the number of reserved batteries, acquiring a battery swapping request from a vehicle, the battery swapping request comprising a number of batteries requested to be swapped within the target time period;
  under a condition that a number of remaining available batteries in the battery swapping station is less than the number of batteries requested to be swapped, determining a battery swapping time of the vehicle in response to the battery swapping request;
  estimating a number of available batteries at the battery swapping time according to a charging parameter of the battery swapping station; and
  under a condition that the estimated number of available batteries is less than the number of batteries requested to be swapped, transmitting electric energy of the grid to a third battery in the battery swapping station to modulate the third battery as an available battery by the electric energy of the grid, so that the number of available batteries at the battery swapping time after modulation is greater than or equal to the number of batteries requested to be swapped.

In an optional embodiment, the number of reserved batteries is a product of the ordered number and a target ratio threshold;
  before the controlling the charging and discharging module to transmit the electric energy of the first battery in the battery swapping station to the grid, the method further comprises:
  determining a category of the battery swapping station; and
  determining a ratio corresponding to the category of the battery swapping station as the target ratio threshold.

In an optional embodiment, the category of the battery swapping station comprises: a first category of battery swapping station or a second category of battery swapping station, wherein a battery swapping frequency of the first category of battery swapping station is higher than a battery swapping frequency of the second category of battery swapping station; and
  the first category of battery swapping station corresponds to a first ratio, the second category of battery swapping station corresponds to a second ratio, and the first ratio is greater than the second ratio.

In an optional embodiment, after the determining the resource value of the unit of electric energy of the grid at the target time, the method further comprises:
  under a condition that the resource value is less than or equal to a second resource threshold, controlling the charging and discharging module to transmit electric energy of the grid to a battery in the battery swapping station, the second resource threshold being less than the first resource threshold.

In an optional embodiment, after the determining the resource value of the unit of electric energy of the grid at the target time, the method further comprises:

under a condition that the resource value is less than the first resource threshold and greater than a second resource threshold, determining a difference between a first resource value and a second resource value;

determining a comparison result between the difference and a preset difference threshold; and controlling the charging and discharging module to perform an electric energy transmission strategy corresponding to the comparison result, wherein the electric energy transmission strategy is a transmission strategy of the electric energy between a battery in the battery swapping station and the grid.

In an optional embodiment, under a condition that the comparison result indicates that the difference is greater than or equal to the preset difference threshold, a first electric energy transmission strategy of transmitting electric energy from the battery in the battery swapping station to the grid is performed; and under a condition that the comparison result indicates that the difference is less than the preset difference threshold, a second electric energy transmission strategy of stopping the electric energy transmission between the battery in the battery swapping station and the grid is performed.

In a second aspect, the embodiments of the present application provides an apparatus for electric energy transmission, comprising:

a resource value determining module configured to determine a resource value of a unit of electric energy of a grid at a target time;

an ordered number determining module configured to, under a condition that the resource value is greater than or equal to a first resource threshold, determine a number of available batteries in a battery swapping station and an ordered number of batteries in the battery swapping station within a target time period, wherein the target time period is a time period between the target time and a time when the resource value falls below the first resource threshold; and a control module configured to, under a condition that the number of available batteries is greater than a number of reserved batteries, control a charging and discharging module to transmit electric energy of a first battery in the battery swapping station to the grid, wherein the number of reserved batteries is greater than or equal to the ordered number, and the first battery comprises one or more of batteries other than the reserved batteries in the battery swapping station.

In a third aspect, a device for electric energy transmission is provided, comprising: a processor and a memory storing computer program instructions;

the processor reading and executing the computer program instructions to implement the method for electric energy transmission provided by the first aspect or any one of the optional embodiments of the first aspect.

In a fourth aspect, a computer storage medium storing computer program instructions thereon which implement, when executed by a processor, the method for electric energy transmission provided by the first aspect or any one of the optional embodiments of the first aspect is provided.

BRIEF DESCRIPTION OF THE DRAWINGS

In order to more clearly illustrate the technical solutions of the embodiments of the present application, the drawings to be used in the embodiments of the present application will be briefly described below. Obviously, the drawings described below are merely some embodiments of the present application, and for those of ordinary skill in the art, other drawings can be obtained based on these drawings without inventive effort.

DETAILED DESCRIPTION

Figure 1:
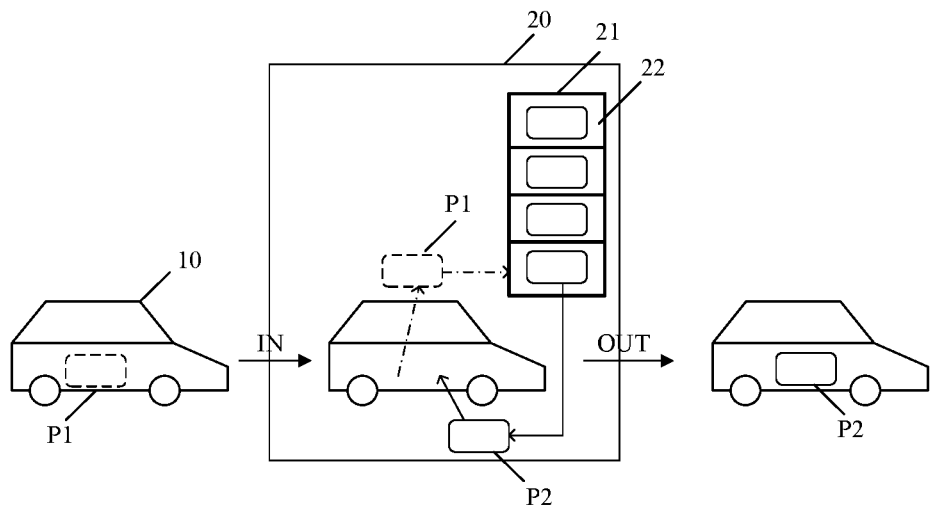
FIG. 1 shows a schematic diagram of an exemplary battery swapping scenario provided by the embodiments of the present application.

The features and exemplary embodiments of various aspects of the present application will be described in detail below. In order to make the objectives, technical solutions, and advantages of the present application clearer, the present application will be further described in detail below with reference to the drawings and specific embodiments. It should be understood that the specific embodiments described herein are merely intended to explain the present application, rather than to limit the present application. For those skilled in the art, the present application can be implemented without some of these specific details. The following description of the embodiments is merely to provide a better understanding of the present application by illustrating the examples of the present application.

It should be noted that, in the present application, relational terms, such as first and second, are used merely to distinguish one entity or operation from another entity or operation, without necessarily requiring or implying any actual such relationships or orders of these entities or operations. Moreover, the terms "comprise", "include", or any other variants thereof, are intended to represent a non-exclusive inclusion, such that a process, method, article or device including a series of elements includes not only those elements, but also other elements that are not explicitly listed or elements inherent to such a process, method, article or device. Without more constraints, the elements following an expression "comprise/include . . . " do not exclude the existence of additional identical elements in the process, method, article or device that includes the elements.

With the rapid development of new energy technologies, various technologies serving new energy have also been greatly improved. Considering the difficulty of charging, the low charging rate, the limited battery life, and the like, the battery swapping technology for new energy vehicles has been developed.

The battery swapping technology utilizes a "vehicle-station separation" approach, in which a battery swapping station provides a battery swapping service for vehicles.

Currently, after the battery is placed into a charging compartment and fully charged by the charging compartment, the battery will stay in the charging compartment until it is taken out and swapped to the vehicle, and the utilization rate of electric energy of the batteries in the battery swapping station is generally low.

Therefore, a technical solution that can improve the utilization rate of electric energy of the batteries in the battery swapping station is needed.

For this, the embodiments of the present application provide a method, apparatus, device, and medium for electric energy transmission, which can be applied to an application scenario for swapping batteries of vehicles. Compared with the related technologies described above, the electric energy of the batteries in the battery swapping station can be reasonably utilized.

In order to better understand the present application, before the electric energy transmission schemes provided by the embodiments of the present application are described, the concepts, such as the vehicle, the battery, and the battery swapping station, involved in the present application are specifically explained first.

(1) Vehicle: the vehicle in the embodiments of the present application can be detachably connected with the battery. In some embodiments, the vehicle may be a sedan or a truck that uses a battery as a power source. The vehicle in the embodiments of the present application may be equipped with one or more batteries.

(2) Battery: the battery in the embodiments of the present application may be, but not limited to, a lithium-ion battery, a lithium-metal battery, a lead-acid battery, a nickel-chromium battery, a nickel-hydrogen battery, a lithium-sulfur battery, a lithium-air battery, or a sodium-ion battery, and the like.

In terms of scale, the battery may be, but not limited to, a battery cell, or a battery module or a battery pack.

In terms of application, the battery can be used in an electric vehicle to supply power to the motor of the electric vehicle as the power source of the electric vehicle. The battery can also provide power for other electrical devices in the electric vehicle, such as the air conditioner, the player, and so on.

(3) Battery swapping station: in the embodiments of the present application, the battery swapping station may refer to a site that provides the battery swapping service for vehicles. For example, the battery swapping station may be, but not limited to, a fixed site, or a mobile site such as a mobile battery swapping vehicle.

After the above concepts are described, in order to facilitate understanding, before the charging scheme of the power battery provided by the embodiments of the present application are specifically described, an exemplary battery swapping scenario will be first described in the following parts of the embodiments of the present application.

FIG. 1 shows a schematic diagram of an exemplary battery swapping scenario provided by the embodiments of the present application. As shown in FIG. 1, the battery swapping station 20 may include a battery swapping cabinet 21. Herein, the battery swapping cabinet 21 may include a plurality of charging compartments 22.

After the vehicle with the available battery P1 installed enters the battery swapping area of the battery swapping station 20, the battery swapping station 20 removes the available battery P1 from the bottom of the vehicle 10 through a battery swapping apparatus, takes out the second battery P2 from the charging compartment 22 and installs the second battery P2 on the vehicle 10, and then the vehicle 10 with the second battery P2 installed may drive away from the battery swapping station 20. With this battery swapping technology, the vehicle can be quickly replenished with energy within a few minutes or even tens of seconds, which improves the user experience.

In addition, the removed available battery P1 may be placed in an idle charging compartment 22 for charging, so that the battery swapping station 20 can continue to provide battery swap services for other vehicles.

After the battery swapping scenario is described, in order to facilitate understanding, before the electric energy scheduling scheme provided by the embodiment of the present application are specifically described, an electric energy scheduling system will be first described in the following parts of the embodiments of the present application.

Figure 2:
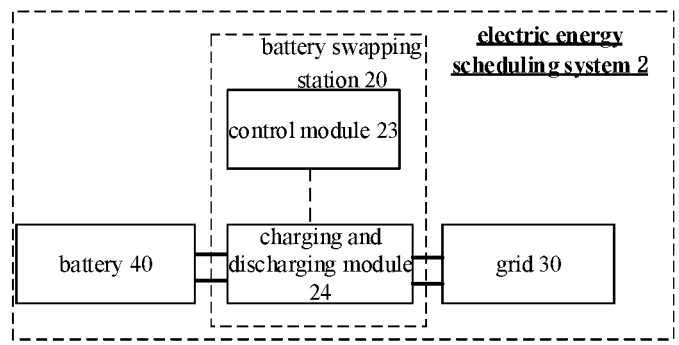
FIG. 2 shows a system architecture diagram of an electric energy scheduling system provided by the embodiments of the present application.

FIG. 2 shows a system architecture diagram of an electric energy scheduling system provided by the embodiments of the present application. As shown in FIG. 2, the electric energy scheduling system may include a battery 40, a control module 23, a charging and discharging apparatus 24 and a grid 30. Herein, the battery swapping station may include the control module 23 and the charging and discharging apparatus 24.

The battery 40 may refer to a battery that is placed in the charging compartment and can be charged and discharged. Exemplarily, the battery 40 may be the second battery P2 placed in the charging compartment, or the first battery P1 before being taken out from the charging compartment.

The control module 23 may refer to a module with a control function that can control the battery 40 to discharge to the grid 30 and control the grid 30 to charge the battery P1. In an example, the control module 23 may be a charging control module in the battery swapping station. Alternatively, the control module 23 may be, but not limited to, a server in the battery swapping station.

The charging and discharging apparatus 24 may charge and discharge the battery 40. In an example, the charging and discharging apparatus 24 may specifically include a voltage converter. The voltage converter may convert AC power of the grid into DC power or convert high-voltage AC power of the grid into low-voltage AC power, and then use the converted electrical energy to charge the battery. The voltage converter may also convert DC power of the battery into AC power or convert low-voltage AC power of the battery into high-voltage AC power, and then use the converted electric energy to provide electric energy to the grid. Exemplarily, the charging and discharging apparatus 24 may include an alternating current-alternating current (Alternating Current-Alternating Current, AC-AC) converter, and/or a direct current-alternating current (Direct Current-Alternating Current, DC-AC) converter. It should be noted that the charging and discharging apparatus 24 may be, but not limited to, a device such as a charging pile supporting the vehicle-to-grid (Vehicle-to-grid, V2G) technology.

It should be noted that when the electric energy of the battery is used to supplement electric energy to the grid, fluctuations of the grid can be compensated and the power supply capacity of the grid can be increased.

After the above electric energy scheduling system is described, in order to better understand the present application, the method, apparatus, device, and medium for electric energy transmission according to the embodiments of the present application will be described in detail below with reference to the drawings. It should be noted that these embodiments are not used to limit the scope of the present application.

Figure 3:
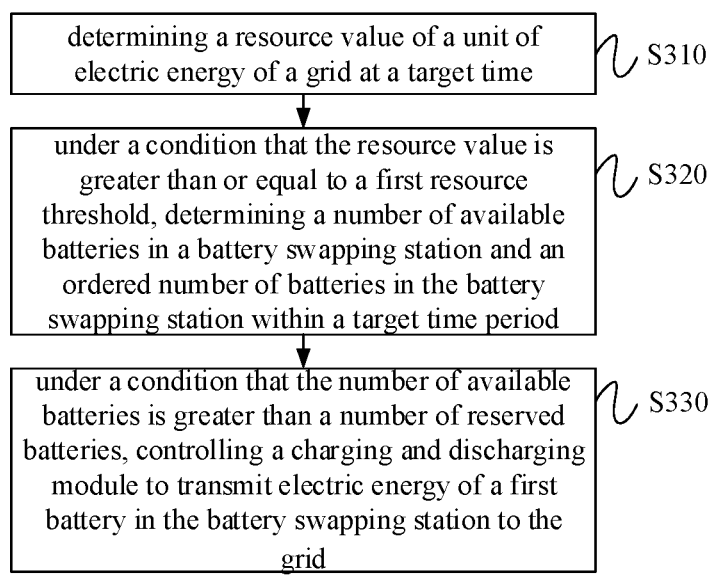
FIG. 3 shows a schematic flowchart of a first method for electric energy transmission provided by the embodiments of the present application.

FIG. 3 shows a schematic flowchart of a first method for electric energy transmission provided by the embodiments of the present application. As shown in FIG. 3, the method for electric energy transmission includes S310 to S330. Herein, the execution entity of various steps of the method for electric energy transmission may be, but not limited to, the control module in the battery swapping station, such as the charging control module in the battery swapping station, the server in the battery swapping station, or a control module outside the battery swapping station, such as a cloud server.

S310: determining a resource value of a unit of electric energy of a grid at a target time.

The target time may refer to a time when the electric energy transmission between the battery and the grid needs to be controlled. Exemplarily, if the electric energy transmission needs to be adjusted in real time, the target time may be the current time.

The resource value is described.

In some embodiments, the resource value of the unit of electric energy of the grid may be used to evaluate the value of the unit of electric energy, for example, the price of the unit of electric energy, the price of electric energy per kilowatt-hour.

In an embodiment, the resource value of the unit of electric energy of the grid may be determined according to the busy degree and load state of the grid. In an example, if the grid is in the peak power consumption period, that is, the grid is in the high-load state, the resource value of the unit of electric energy of the grid is high, for example, the resource value of the unit of electric energy is the electricity price, and the electricity price of the grid in the peak power consumption period is the peak price. In another example, if the grid is in the low power consumption period, that is, the grid is in the low-load state, the resource value of the unit of electric energy of the grid is low, for example, the resource value of the unit of electric energy is the electricity price, and the electricity price of the grid in the low power consumption period is the trough price. In another example, if the grid is in the normal power consumption period, that is, the grid is in the normal-load state, the resource value of the unit of electric energy of the grid is a middle value, for example, the resource value of the unit of electric energy is the electricity price, and the electricity price of the grid in the normal power consumption period is the normal price. It should be noted that the grid load (a) in the peak power consumption period is greater than the grid load (c) in the normal power consumption period, and the grid load (c) in the normal power consumption period is greater than the grid load (b) in the low power consumption period. It should be noted that, in some regions, the power consumption period may include at least two of the peak power consumption period, the normal power consumption period, and the low power consumption period.

Specific embodiments for acquiring the resource value are described.

In some embodiments, the resource value of the unit of electric energy of the grid at the target time may be determined according to the fluctuation pattern of the resource value of the unit of electric energy over time. Exemplarily, three different time periods of the day may be used as the peak power consumption period, the low power consumption period, and the normal power consumption period of the grid. The resource value corresponding to the target time may be determined according to the time period in which the target time is in.

For example, 00:00-06:00 of the day is the low power consumption period, and if the target time is in the low power consumption period, the resource value corresponding to the target time is 0.2 yuan. 06:00 to 18:00 of the day is the normal power consumption period, and if the target time is in the normal power consumption period, the resource value corresponding to the target time is 0.5 yuan. 18:00 to 24:00 of the day is the peak power consumption period, and if the target time is in the peak power consumption period, the resource value corresponding to the target time is 1 yuan. It should be noted that the peak power consumption period, the low power consumption period, and the normal power consumption period for different regions are divided in different manners, which is not limited in the embodiments of the present application. In S310, the peak power consumption period, the low power consumption period, and the normal power consumption period of the grid may be determined according to the region.

In some other embodiments, the resource value of the unit of electric energy of the grid at the target time may be directly determined according to the time period to which the target time belongs. For example, if the target time is in the peak power consumption period, the resource value at the target time is the peak price. If the target time is in the low power consumption period, the resource value at the target time is the trough price. If the target time is in the normal power consumption period, the resource value at the target time is the normal price.

It should be noted that the resource value of the unit of electric energy of the grid at the target time may also be determined according to specific scenarios and actual demands.

S320: under a condition that the resource value of the unit of electric energy of the grid at the target time is greater than or equal to a first resource threshold, determining a number A of available batteries in a battery swapping station and an ordered number B of batteries in the battery swapping station within a target time period.

The first resource threshold is used to determine whether the grid is in the peak power consumption period. Under a condition that the resource value of the unit of electric energy of the grid at the target time is greater than or equal to the first resource threshold, it is determine that the grid is in the peak power consumption period. In some embodiments, the first resource threshold may be determined according to the resource value of the grid in the peak power consumption period. For example, the first resource threshold may be equal to the resource value of the grid in the peak power consumption period, alternatively, the first resource threshold may be less than the resource value of the peak power consumption period and greater than the resource value of the normal power consumption period, which will not be repeated.

The target time period may be a time period from the target time to the end of the peak power consumption period of the grid. Specifically, the target time period may be a time period between the target time and the time when the resource value falls below the first resource threshold. For example, if the peak power consumption period of the grid is 18:00 to 24:00, all of the resource values of the electric energy of the grid in the peak power consumption period are greater than or equal to the first resource threshold. If the target time is 19:30, the target time period may be 19:30-24:00.

The available battery is described.

The available battery may be a battery of which the state parameter is within a preset value range. For example, the available battery may be a battery that satisfies conditions for being swapped to the vehicle.

In an embodiment, the state parameter may be, but not limited to, a state of charge (State of Charge, SOC), electric quantity, a state of health (State of Health, SOH), temperature, voltage, and other parameters that can reflect the electrical performance of the battery.

In an example, taking the SOC as an example, the available battery may be a battery with 100% SOC, that is, a fully charged battery. Alternatively, the available battery may be a battery with 80% SOC or higher.

In another example, the battery temperature of the available battery should also be within a preset temperature range. Herein, the preset temperature range may be a temperature range suitable for battery operation. When the temperature of the battery is within the preset temperature range, the battery may have well charge and discharge performance, safety, and stability. Exemplarily, the preset temperature range may be a temperature range for normal operation of the battery, for example, the preset temperature range may be (+20° C., +55° C.), or (+10° C., +55° C.). It should be noted that the preset temperature range may be determined according to the temperature of the environment where the battery is located, the electrical performance of the battery, and other parameters, which is not specifically limited.

In some embodiments, if one battery needs to be installed on the vehicle, the available battery can satisfy the above conditions.

In some other embodiments, if a plurality of batteries need to be installed on the vehicle, for example, the number of batteries required by the vehicle is L, when determining the number of available batteries, N groups of available batteries are required, and each group includes L available batteries, in which L is an integer greater than or equal to 2, and N is an integer.

The L batteries in each group also need to satisfy a preset group of conditions, in which the preset group of conditions may include at least one of the following sub-conditions A-C.

Sub-condition A: the voltage difference among the available batteries is less than a preset voltage difference threshold. In an example, the preset voltage difference threshold may be determined according to the maximum allowable sampling error value $\Delta V$ of the battery cells in the battery and the number L of battery cells in a single available battery. For example, the preset voltage difference threshold may be $\Delta V \times L$. For example, the maximum allowable sampling error value $\Delta V$ may be 0.48 volts (V). It should be noted that the preset voltage difference threshold may be set in different methods or as different values according to actual scenarios and specific demands, for example, the specific value may be 2 V, and its setting methods and specific values are not limited.

By setting the sub-condition A, it is possible to prevent a risk of burning the relay on the power supply line of the battery due to an excessive voltage difference among the available batteries, and the safety and reliability of the battery are improved. In addition, it is possible to prevent the circulating current among the available batteries resulting from the voltage difference among the available batteries from consuming the battery power, and the power consumption speed of the battery is reduced.

Sub-condition B: the difference among the battery parameters of the available batteries is less than a preset electric quantity difference threshold. Herein, the battery parameter may be a parameter that can evaluate the capacity of the battery, for example, but not limited to, the electric quantity of the battery, or the SOC of the battery. In addition, the preset electric quantity difference threshold may be set according to actual scenarios and specific demands. For example, the power parameter is SOC, the preset electric quantity difference threshold may be 3% or 5%, and its setting methods and specific values are not limited.

In some embodiments, if the battery life difference is too great, the SOCs of the batteries with the same voltage will be different. If the L batteries satisfy both the above sub-condition A and the sub-condition B, the consistency of the charging and discharging characteristics of the batteries can be ensured, thereby avoiding additional power consumption and safety risks caused by the inconsistent battery life in use.

Sub-condition C: the SOH difference among the available batteries is less than a preset SOH difference threshold.

The SOH represents the battery aging degree. Herein, the smaller the SOH, the greater the battery aging degree. For example, SOH=100% indicates that the battery is newly made, that is, the battery have a battery aging degree corresponding to the Beginning of Life (Beginning of Life, BOL). SOH=0% indicates that the battery is out-of-use. In a specific example, the SOH of the battery at the target time may be represented by a ratio of the full charge capacity of the battery at the target time to the rated capacity. In another specific example, the SOH of the battery at the target time may be a ratio of the remaining cycle number of the battery at the target time to the total cycle number of the battery. It should be noted that the SOH may also be represented in other ways, for example, but not limited to, the maximum discharge capacity and the internal resistance.

The preset SOH difference threshold may be set according to actual scenarios and specific demands, and its setting methods and specific values are not limited.

Since the state of health difference among the batteries will cause charge and discharge performance difference during the use of the batteries, the sub-condition C can ensure the consistency of the charge and discharge characteristics of the batteries, so as to avoid additional power consumption and safety risks caused by the inconsistent battery life in use.

Sub-condition D: the temperature difference among the available batteries is less than a preset temperature difference threshold.

In some embodiments, the preset temperature difference threshold may be set according to actual scenarios and specific demands, for example, 3 degrees Celsius (° C.), and its setting methods and specific values are not limited.

With the sub-condition D, it may be ensured that the charge and discharge performance of each battery pack is in a better state by adjusting the temperature.

In some embodiments, if more than L batteries can be grouped, for example, if P available batteries can be grouped, in addition to the above sub-conditions, L available batteries may be selected from the P available batteries according to the following sub-conditions.

Sub-condition E: the first L batteries that entered the battery swapping station are selected from the P available batteries and grouped. With the sub-condition E, idle batteries may be prevented in the battery swapping station to balance the use frequency of various batteries, thereby ensuring the balance of battery life as a whole.

Sub-condition F: if there are a plurality of groups of selectable battery packs in the battery swapping station, in which all of the batteries in each group of selectable battery packs satisfy the above preset group of conditions, batteries in the group of selectable battery packs with the highest battery swapping amount may be selected as the available batteries.

Moreover, the ordered number B is described.

In an example, the ordered number B may be a first ordered number x that the vehicle has ordered for battery swapping in the target time period of the day, that is, the actual ordered number in the target time period of the day in which the electric energy transmission between the battery and the grid is controlled by the battery. For example, if the battery swapping station receives ordered battery swapping information from 10 vehicles in the target time period, and each vehicle needs 2 batteries to be swapped, the ordered number of batteries in the target time period may be 20.

In another example, the ordered number B may be a second ordered number y in the target time period of the current day that is estimated according to the ordered numbers of batteries in the target time period of the past days. For example, the ordered number y in the target time period may be the average value of the ordered numbers in the target time period of multiple days before the current day. For example, if the target time period is 19:30-24:00 on July 30, the average value of the ordered numbers in the period 19:30-24:00 of each day from April 29 to July 29 may be used as the second ordered number y of the period 19:30-24:00 on July 30.

In yet another example, the ordered number in the target time period of the current day may be determined according to the first ordered number x and the second ordered number y. For example, if the estimated second ordered number y is less than the first ordered number x, since unexpected battery swapping may occur in the target time period, a value greater than the first ordered number x may be selected as the ordered number, such as a sum of the first ordered number x and a preset number, or a product of the first ordered number x multiplied by a first rate, in which the first rate is greater than 1.

S330: under a condition that the number A of available batteries is greater than a number of reserved batteries, controlling a charging and discharging module to transmit electric energy of a first battery in the battery swapping station to the grid. Herein, under a condition that the number A of available batteries is greater than the number of reserved batteries, it indicates that the available batteries in the battery swapping station are sufficient for the battery swapping service in the target time period. Moreover, for a reasonable resource scheduling, after sufficient reserved batteries are reserved for the battery swapping service in the target time period, the electric energy of the remaining batteries may be transmitted to the grid to supplement the electric energy of the grid and maintain the stability of the grid.

The reserved batteries may be a plurality of batteries selected from the available batteries. The reserved batteries are reserved to provide a battery swapping service for the vehicle in the target time period. Exemplarily, the electric energy of the reserved batteries will not be transmitted to the grid during the current electric energy transmission.

The number of reserved batteries is described. In terms of quantity, in order to ensure the battery swapping capability of the battery swapping station in the target time period, the number M of reserved batteries may be a value greater than or equal to the ordered number B.

In some embodiments, the number M of reserved batteries may be a sum of the ordered number and a preset number. Herein, the preset number may be set according to actual scenarios and specific demands, which will not be detailed herein.

In some other embodiments, the number M of reserved batteries may be greater than or equal to a product of the order number B and a target ratio threshold $\alpha$. For example, if the order number B and the target ratio threshold are integers, M may be equal to $B*\alpha$. For another example, if the order number B and the target ratio threshold are not integers, M may be equal to the rounded up value of $B*\alpha$. Exemplarily, if 24 batteries in the battery swapping station are ordered in 19:30 to 24:00, and the target ratio threshold $\alpha$ is 1.2, the number M of reserved batteries may be rounded up value of $24*1.2$ (28.8), that is, M=29.

Herein, the target ratio threshold may be greater than or equal to 1. In an embodiment, in order to further improve the flexibility of the electric energy scheduling, different target ratio thresholds may be set for different battery swapping stations. Specifically, the target ratio threshold may be determined according to the amount/busy degree of the battery swapping in the battery swapping station.

Correspondingly, the method for electric energy transmission may further include the step of determining the target ratio threshold, that is, the following steps A1 and A2.

Step A1: determining a category of the battery swapping station.

In an example, the category of the battery swapping station includes: a first category of battery swapping station or a second category of battery swapping station, in which the first category of battery swapping station may be called a busy station, and the second category of battery swapping station may be called an idle station. A battery swapping frequency of the first category of battery swapping station is higher than a battery swapping frequency of the second category of battery swapping station. It should be noted that the battery swapping stations may be divided into three or more different categories of battery swapping stations according to the battery swapping capability of the battery swapping stations.

With the example, the target ratio threshold can be determined according to the amount/busy degree of the battery swapping in the battery swapping station, so that the busy battery swapping station can reserve a larger number of batteries to satisfy the battery swapping demand of the vehicle in the target time period and supplement the remaining electric energy to the grid at the same time, and moreover, the idle battery swapping station can transmit more electric energy to the grid and satisfy the battery swapping demand of the vehicle in the target time period at the same time, which further improves the flexibility of the electric energy scheduling.

Next, methods for determining the category of the battery swapping station will be specifically described by a plurality of examples.

In an example, the category of the battery swapping station may be determined according to a kept-in-station duration of the battery in the battery swapping station. In a specific example, if the kept-in-station duration of a battery in the battery swapping station is greater than or equal to a first duration threshold, the battery swapping station is determined as the second category of battery swapping station; otherwise, the battery swapping station is determined as the first category of battery swapping station. With the example, if the kept-in-station duration of a battery in the battery swapping station is greater than or equal to the first duration threshold, it indicates that the battery in the battery swapping station is idle for a long time, and correspondingly, the battery swapping station is idle, that is, the battery swapping station is determined as the second category of battery swapping station. In another specific example, if the kept-in-station durations of all of the batteries in the battery swapping station are less than a second duration threshold, all of the batteries in the battery swapping station are new batteries, it indicates that the batteries in this battery swapping station are frequently going in and out of the battery swapping station due to a high battery swapping frequency, that is, the battery swapping station is determined as the first category of battery swapping station; otherwise, the battery swapping station is determined as the second category of battery swapping station. In yet another specific example, whether the battery swapping station is the first category of battery swapping station or the second category of battery swapping station may be determined according to whether a ration of the number of batteries in the battery swapping station of which the kept-in-station duration is greater than the first duration threshold to the total number of batteries in the battery swapping station is less than a first ratio threshold. Alternatively, whether the battery swapping station is the first category of battery swapping station or the second category of battery swapping station may be determined according to whether a ration of the number of batteries in the battery swapping station of which the kept-in-station duration is less than the second duration threshold to the total number of batteries in the battery swapping station is greater than a second ratio threshold. Herein, the kept-in-station duration is a duration from the time when the battery is placed into the charging compartment to the current time. Herein, the current time may be the time when step A1 is performed. The first duration threshold and the second duration threshold may be set according to specific scenarios and actual demands, which is not limited herein.

In another example, the battery swapping station may be determined as the first category of battery swapping station or the second category of battery swapping station according to whether the number of battery swapping per day or the total number of battery swapping is greater than a first number threshold. For example, if the number of battery swapping per day or the total number of battery swapping is greater than the first number threshold, the battery swapping station may be determined as the first category of battery swapping station. For another example, if the number of battery swapping per day or the total number of battery swapping is less than or equal to the first number threshold, the battery swapping station may be determined as the second category of battery swapping station. Herein, the first number threshold may be set according to specific scenarios and actual demands, which is not limited herein.

In yet another example, the battery swapping station may be determined as the first category of battery swapping station or the second category of battery swapping station according to a ratio of the number of battery swapping per day to the total number of batteries in the battery swapping station. For example, if the ratio of the number of battery swapping per day to the total number of batteries in the battery swapping station is greater than a first ratio threshold, the battery swapping station may be determined as the first category of battery swapping station. If the ratio of the number of battery swapping per day to the total number of batteries in the battery swapping station is less than or equal to the first ratio threshold, the battery swapping station may be determined as the second category of battery swapping station. Herein, the first ratio threshold may be set according to specific scenarios and actual demands, which is not limited herein.

In yet another example, whether the battery swapping station is the first category of battery swapping station may be determined according to whether the ordered number of battery swapping of the vehicle is greater than a second number threshold. For example, if the ordered number of battery swapping of the vehicle is greater than the second number threshold, the battery swapping station may be determined as the first category of battery swapping station. For another example, if the ordered number of battery swapping of the vehicle is less than or equal to the second number threshold, the battery swapping station may be determined as the second category of battery swapping station. Herein, the second number threshold may be set according to specific scenarios and actual demands, which is not limited herein.

Step A2: determining a ratio corresponding to the category of the battery swapping station as the target ratio threshold.

Herein, the first category of the battery swapping station corresponds to a first ratio $\alpha_1$, the second category of the battery swapping station corresponds to a second ratio $\alpha_2$, and the first ratio $\alpha_1$ is greater than the second ratio $\alpha_2$. Exemplarily, the first ratio $\alpha_1$ may be 1.2, and the second ratio $\alpha_2$ may be 1.1. It should be noted that the values of the first ratio $\alpha_1$ and the second ratio $\alpha_2$ may be set according to actual situations and specific scenarios, which is not limited herein.

With the embodiment, different target ratio thresholds can be set for different battery swapping stations, so that the different battery swapping stations reserve different numbers of batteries, which further improves the flexibility of the electric energy scheduling.

The first battery may refer to a battery of which the electric energy should be supplemented to the grid. In an example, the first battery may refer to all the batteries other than the reserved batteries in the battery swapping station. In another example, the first battery may refer to a part of the batteries other than the reserved batteries in the battery swapping station, such as the remaining one or more batteries other than the reserved batteries.

The charging and discharging module may be, but not limited to, a charging and discharging module in the battery swapping station, such as the charging and discharging module 24 as shown in FIG. 2, or a charging and discharging module outside the battery swapping station.

For the specific embodiment of S330, in some embodiments, all the remaining electric energy of the first battery may be transmitted to the grid. Alternatively, a part of the electric energy of the first battery exceeding a first electric energy threshold may be transmitted to the grid, and the specific transmission manner is not limited in the embodiments of the present application.

With the method for electric energy transmission of the embodiments of the present application, when the resource value of the unit of electric energy of the grid at the target time is greater than the first resource threshold, that is, when the power consumption load of the grid is high, under a condition that the number of available batteries is greater than the number of reserved batteries, that is, under a condition that the number of batteries in the battery swapping station that can be swapped to the vehicle in the target time period is sufficient, the electric energy of one or more first batteries other than the reserved batteries in the battery swapping station can be transmitted to the grid. Since the target time period is a time period between the target time and a time when the resource value falls to the first resource threshold, that is, the target time period can present a peak power consumption period after the target time, through transmitting the electric energy of the first battery to the grid, the battery swapping capability of the battery swapping station in the peak power consumption period is guaranteed, and moreover, the surplus electric energy of the battery swapping station can be supplemented to the grid, so that the electric energy of the batteries in the battery swapping station can be reasonably utilized when the power consumption load of the grid is high.

In some embodiments, in order to ensure the reasonable resource scheduling, during or after the controlling the charging and discharging module to transmit the electric energy of the first battery in the battery swapping station to the grid, a first total electric energy transmitted in S330 may be determined, a first total resource value corresponding to the first total electric energy is then determined according to the resource value of the unit of electric energy of the grid at the target time determined in S310. Then, the first total resource value is transferred from the grid to the battery swapping station.

After the electric energy transmission scheme under a condition that the number of available batteries in the battery swapping station can satisfy the battery swapping demand of the battery swapping station in the target time period is fully described in conjunction with FIG. 3 and the above related content, in some embodiments, the embodiments of the present application further provide an electric energy transmission scheme under a condition that the number of available batteries in the battery swapping station cannot satisfy the battery swapping demand of the battery swapping station in the target time period.

Figure 4:
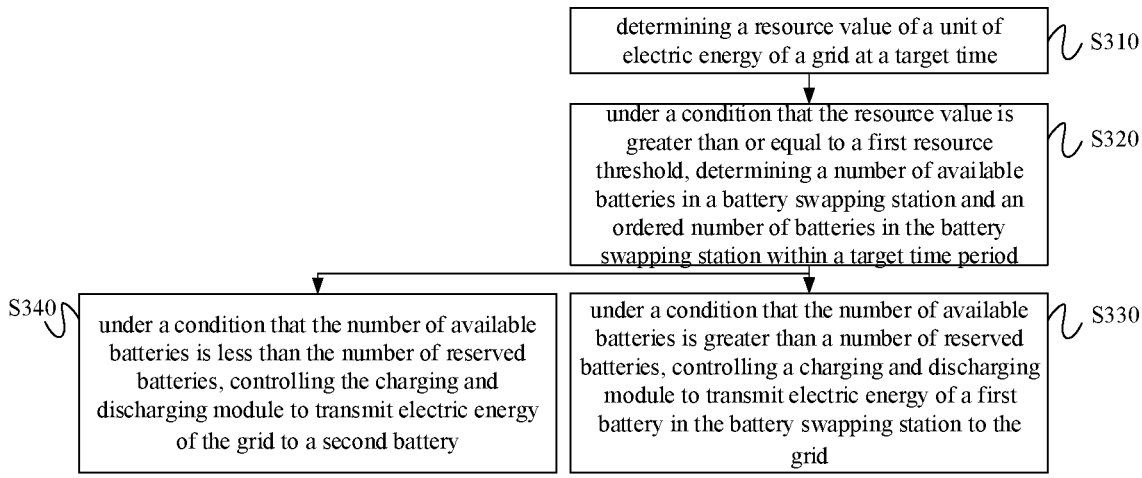
FIG. 4 shows a schematic flowchart of a second method for electric energy transmission provided by the embodiments of the present application.

Correspondingly, in order to reserve sufficient reserved batteries for the battery swapping service in the target time period, and to ensure the battery swapping capability of the battery swapping station in the target time period, FIG. 4 shows a schematic flowchart of a second method for electric energy transmission provided by the embodiments of the present application. FIG. 4 differs from FIG. 3 in that the method for electric energy transmission further includes S340 after S320.

S340: under a condition that the number A1 of available batteries is less than the number B of reserved batteries, controlling the charging and discharging module to transmit electric energy of the grid to a second battery other than the available batteries in the battery swapping station to modulate the second battery as an available battery by the electric energy of the grid, so that the number of available batteries after modulation is greater than the number B of reserved batteries. Exemplarily, if the number of second batteries is A2, the number A of available batteries after modulation is equal to a sum of A1 and A2.

In one embodiment, the electric quantity of the second battery may be increased by the electric energy of the grid. When the electric quantity of the second battery is greater than or equal to the electric quantity of the available battery, the second battery is modulated as the available battery.

In an embodiment, the second battery may be a battery other than the available batteries in the battery swapping station that can be modulated as an available battery by charging. In an example, under a condition that the battery grouping condition is not considered, if the difference between the number B of reserved batteries and the number A1 of available batteries is Q, at least Q batteries with the highest electric quantity may be selected from the remaining batteries other than the available batteries in the battery swapping station as the second batteries. In another example, under a condition that the battery grouping condition is considered, Q batteries may be selected from the batteries other than the available batteries in the battery swapping station satisfying other conditions besides the electric quantity as the second batteries.

With the embodiment, sufficient available batteries can be prepared for the battery swapping service in the battery swapping station in the peak power consumption period, which ensures the battery swapping capability for users in the peak power consumption period. Moreover, compared with the scheme in which all of the batteries are fully charged in the peak power consumption period, the embodiment will not cause additional power supply burden to the grid in a high-load state, the reasonability of electric energy resource scheduling for users in the peak power consumption period is achieved. Therefore, the embodiment takes into account both the battery swapping capability and the reasonability of electric energy resource scheduling for users in the peak power consumption period.

In an embodiment, in order to ensure the reasonable resource scheduling, during or after the controlling the charging and discharging module to transmit the electric energy of the grid to the second battery in the battery swapping station, a second total electric energy transmitted in S340 may be determined, a second total resource value corresponding to the second total electric energy is then determined according to the resource value of the unit of electric energy of the grid at the target time determined in S310. Then, the second total resource value is transferred from the battery swapping station to the grid.

After the first electric energy transmission scheme under a condition that the number of available batteries cannot satisfy the battery swapping demand of the battery swapping station in the target time period is described in detail in conjunction with FIG. 4, in some embodiments, the embodiments of the present application further provide a second electric energy transmission scheme under a condition that the number of available batteries cannot satisfy the battery swapping demand of the battery swapping station in the target time period.

Figure 5:
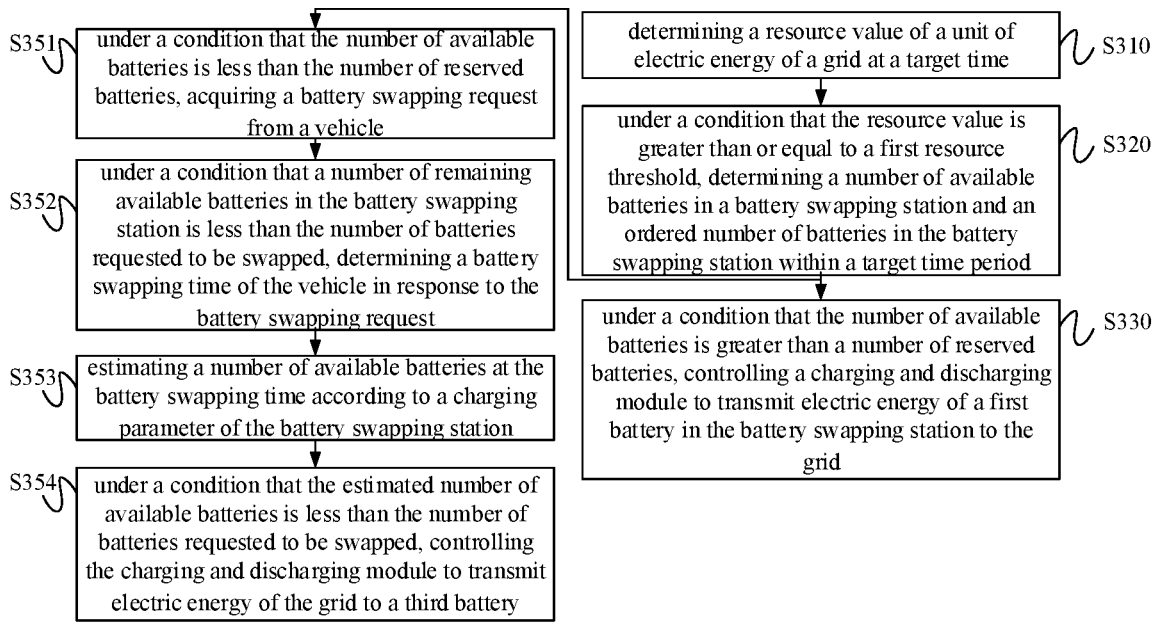
FIG. 5 shows a schematic flowchart of a third method for electric energy transmission provided by the embodiments of the present application.

Correspondingly, in order to reserve sufficient reserved batteries for the battery swapping service in the target time period, and to ensure the battery swapping capability of the battery swapping station in the target time period, FIG. 5 shows a schematic flowchart of a third method for electric energy transmission provided by the embodiments of the present application. FIG. 5 differs from FIG. 3 in that the method for electric energy transmission further includes S351 to S354 after S320.

S351: under a condition that the number A3 of available batteries is less than the number B of reserved batteries, acquiring a battery swapping request from a vehicle.

The battery swapping request includes a number F of batteries requested to be swapped within the target time period. The battery swapping request is used to request the battery swapping station to provide the battery swapping service in the target time period for the vehicle that initiated the battery swapping request. In an embodiment, the battery swapping request may include the ordered battery swapping time and/or user driving data of the vehicle. In an example, the ordered battery swapping time is within the target time period, and the user may request the battery swapping station to provide the battery swapping service for the vehicle at the ordered battery swapping time. In an example, the driving data includes location information when the vehicle triggers the operation related to the ordered battery swapping and user driving habit information. The user driving habit information may include driving speed and/or braking frequency of the user in a period of time, and other information.

The device for initiating the battery swapping request is described. In an embodiment, the battery swapping request may be initiated by an electronic terminal such as a mobile phone, a tablet computer, and a smart watch of a person related to the vehicle, alternatively, by a car networking device such as a remote information processor (Telematics BOX, TBOX) or RDB (a kind of car networking device).

The method for initiating the battery swapping request is described. In some embodiments, the battery swapping request may be initiated by the user through a battery swapping ordering application (APP) or a battery swapping ordering page on a touch screen of the car networking device or an electronic terminal such as a mobile phone. In some other embodiments, the battery swapping request may be sent by the server of the battery swapping station after the vehicle arrives at the battery swapping station.

In some embodiments, in order to ensure the most basic battery swapping capability in the peak power consumption period, under a condition that the number A3 of available batteries is determined to be less than the number B of reserved batteries, the second battery in the battery swapping station may be modulated as an available battery by charging the second battery with the electric energy of the grid, in which the total number of available batteries after modulation may be greater than or equal to the number of reserved batteries. For example, the number of available batteries after modulation may be greater than the number of reserved batteries. Moreover, it may be considered that after S340 is performed, S351 to S354 are performed during the actual ordering process in the target time period.

S352: under a condition that a number of remaining available batteries in the battery swapping station is less than the number of batteries requested to be swapped, determining a battery swapping time T1 of the vehicle in response to the battery swapping request.

In an example, the battery swapping request may include the ordered battery swapping time, and in S352, the ordered battery swapping time may be analyzed from the battery swapping request.

In another example, the ordered request may include the driving data, and the battery swapping time T1 may be estimated according to the driving data. The specific method for calculating the estimated battery swapping time T1 includes:

calculating a first battery swapping time according to the
   location information of the user, the location information of the battery swapping station, and the driving habit information.

Exemplarily, an average driving speed V may be calculated according to the driving speed of the user in a period of time, and a distance S between the vehicle and the battery swapping station may be calculated according to the location information of the user and the location information of the battery swapping station. The battery swapping time T1 is calculated according to the distance S and the average driving speed V. For example, a sum of a reference time T0 and a ratio Ta of the distance S to the average driving speed V may be used as the battery switching time T1. For another example, the braking number N of the user is calculated according to the braking frequency of the user and the ratio Ta, and a sum of the ratio Ta, the reference time T0, and a product Tb of an average braking duration and N is used as the battery switching time T1. Herein, the reference time T0 may be, but not limited to, the time when the battery swapping request is received, the time when the user triggers controls related to the battery swapping request on the terminal device, or the time when the terminal device initiates the battery swapping request.

S353: estimating a number of available batteries at the battery swapping time according to a charging parameter of the battery swapping station.

In some embodiments, the number of available batteries that can be modulated by the battery swapping station through charging the remaining batteries other than the available batteries in the battery swapping station with a target charging parameter until the battery swapping time may be estimated. In an example, the maximum number of available batteries that can be modulated by the battery swapping station through charging the remaining batteries other than the available batteries with the maximum charging parameter that can be provided by the battery swapping station until the battery swapping time may be estimated. Therefore, the estimated number of available batteries at the battery swapping time can reflect the maximum charging capacity of the battery swapping station.

Herein, the target charging parameter may be one of the charging parameters that may be provided by the battery swapping station, for example, under a condition that the battery swapping station may charge the battery with a first charging parameter and a second charging parameter. Herein, the first charging parameter and the second charging parameter may be parameters related to the battery charging rate. Herein, the charging rate corresponding to the second charging parameter is greater than the charging rate corresponding to the first charging parameter. In the embodiment, the battery swapping station may charge the battery with the first charging parameter to slow down the battery aging and prolong the battery life as much as possible. The battery swapping station may also charge the battery with the second charging parameter to improve the charging efficiency. In the embodiment, in response to the battery swapping request, a second battery swapping time and a second battery swapping amount may be estimated according to the second charging parameters to improve the estimation accuracy, so that the second battery swapping time and the second battery swapping amount can be estimated according to the potential battery swapping capability of the battery swapping station, and the battery swapping capability of the battery swapping station is improved.

In an example, the first charging parameter may be a first charging rate, and the second charging parameter may be a second charging rate. Herein, the first charging rate is less than the second charging rate. In another example, the first charging parameter may be a first current value, and the second charging parameter may be a second current value. Herein, the first current value is less than the second current value. In yet another example, the first charging parameter may be a first voltage value, and the second charging parameter may be a second voltage value. Herein, the first voltage value is less than the second voltage value.

S354: under a condition that the estimated number of available batteries is less than the number of batteries requested to be swapped, controlling the charging and discharging module to transmit electric energy of the grid to a third battery in the battery swapping station to modulate the third battery as an available battery by the electric energy of the grid, so that the number of available batteries at the battery swapping time after modulation is greater than or equal to the number of batteries requested to be swapped. Herein, if the estimated number of available batteries is greater than the number of batteries requested to be swapped, it is guaranteed that the battery swapping station can prepare the required number of available batteries for the vehicle before the vehicle arrives at the battery swapping station, so as to provide good battery swapping service for the vehicle.

In the actual situation, unexpected behaviors, such as the vehicle may suddenly decide to swap the battery or cancel swapping the battery, make it difficult to predict the behavior of ordering battery swapping, resulting in that the battery swapping station cannot satisfy the user demands for battery swapping in the target time period, which affect the user experience of battery swapping, or that the number of available batteries in the battery swapping station is far greater than the number of batteries to be swapped in target time period, which causes the available batteries to be idle. With the embodiment, before the vehicle arrives at the battery swapping station for a battery swapping, sufficient available batteries can be prepared for the vehicle according to the battery swapping request, which ensures that sufficient available batteries can be swapped for the vehicle, thereby ensuring the user experience of battery swapping. Moreover, the third battery can be prepared after receiving the battery swapping request from the vehicle, the batteries can be prepared according to the actual battery swapping demand of the vehicle, thereby ensuring a reasonable scheduling between the electric energy of the batteries in the battery swapping station and the electric energy of the grid. Therefore, with the scheme provided by the embodiment, both the user experience of battery swapping and the reasonable scheduling between the electric energy of the batteries in the battery swapping station and the electric energy of the grid can be taken into account.

In an embodiment, in order to ensure the reasonable resource scheduling, during or after the controlling the charging and discharging module to transmit the electric energy of the grid to the third battery in the battery swapping station, a third total electric energy transmitted in S354 may be determined, a third total resource value corresponding to the third total electric energy is then determined according to the resource value of the unit of electric energy of the grid at the target time determined in S310. Then, the third total resource value is transferred from the battery swapping station to the grid.

After the electric energy transmission scheme for the peak power consumption period is fully described in conjunction with FIGS. 3 to 5, in some embodiments, the embodiments of the present application further provide an electric energy transmission for the low power consumption period.

Figure 6:
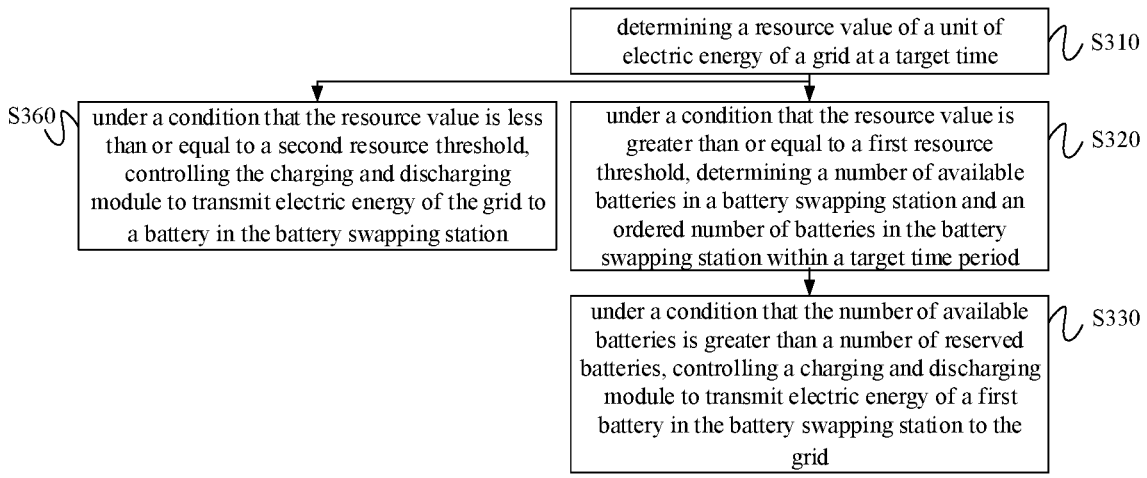
FIG. 6 shows a schematic flowchart of a fourth scheme for electric energy transmission provided by the embodiments of the present application.

Correspondingly, FIG. 6 shows a schematic flowchart of a fourth scheme for electric energy transmission provided by the embodiments of the present application. FIG. 6 differs from FIG. 3 in that the electric energy transmission scheme further includes S360 after S310.

S360: under a condition that the resource value is less than or equal to a second resource threshold, controlling the charging and discharging module to transmit electric energy of the grid to a battery in the battery swapping station. That is, when the grid is in the low power consumption period, the electric quantity of the grid is relatively sufficient and the resource value is low, the electric energy of the grid can be stored in the battery of the battery swapping station.

The second resource threshold may be used to distinguish the resource value in the normal power consumption period and the resource value in the low power consumption period. The second resource threshold is less than the first resource threshold. Exemplarily, the second resource threshold may be less than the resource value in the normal power consumption period and greater than or equal to the resource value in the low power consumption period.

For the specific embodiment of S360, it should be noted that whether a part of the batteries or all of the batteries in the battery swapping station are charged to a certain target SOC may be determined according to actual conditions and specific demands, and the specific embodiment of S360 is not limited in the present application. Exemplarily, all of the batteries in the battery swapping station may be charged to a first electric quantity with the electric energy of the grid, for example, to a fully charged state (100% SOC) or to 80% SOC.

When the grid is in a low power consumption period, that is, when the electric energy of the grid is relatively sufficient and the resource value is low, the electric energy of the grid can be stored in the batteries in the battery swapping station and used to maintain the stability of the grid in the subsequent peak power consumption period, thereby ensuring the reasonability of electric energy transmission.

In an embodiment, in order to ensure the reasonable resource scheduling, during or after the controlling the charging and discharging module to transmit the electric energy of the grid to the battery in the battery swapping station, a fourth total electric energy transmitted in S360 may be determined, a fourth total resource value corresponding to the fourth total electric energy is then determined according to the resource value of the unit of electric energy of the grid at the target time determined in S310. Then, the fourth total resource value is transferred from the battery swapping station to the grid.

After the electric energy transmission scheme for the low power consumption period is fully described in conjunction with FIG. 6, in some embodiments, the embodiments of the present application further provide an electric energy transmission for the normal power consumption period.

Figure 7:
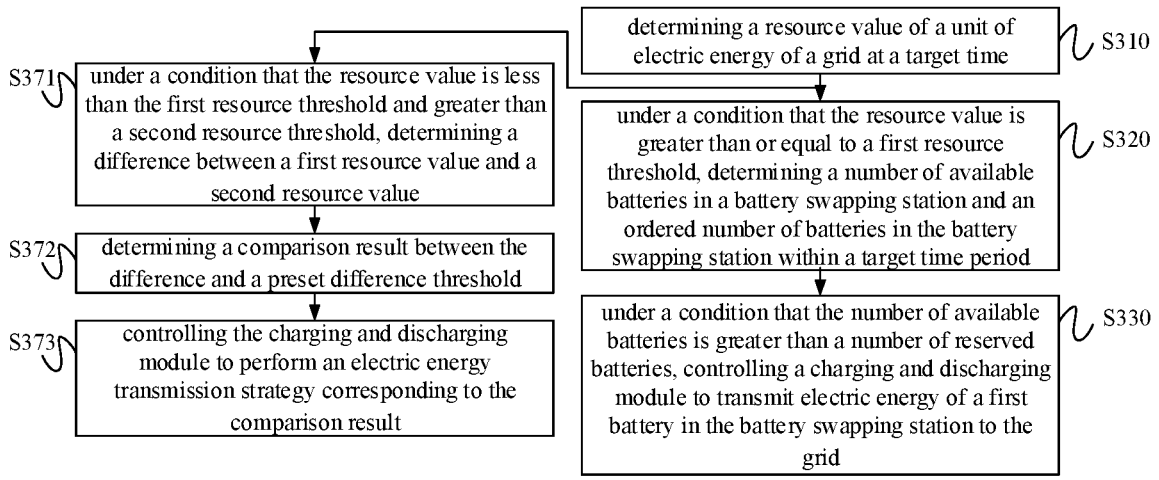
FIG. 7 shows a schematic flowchart of a fifth scheme for electric energy transmission provided by the embodiments of the present application.

Correspondingly, FIG. 7 shows a schematic flowchart of a fifth scheme for electric energy transmission provided by the embodiments of the present application. FIG. 7 differs from FIG. 3 in that the electric energy transmission scheme further includes S371 to S373 after S310.

S371: under a condition that the resource value is less than the first resource threshold and greater than a second resource threshold, determining a difference between a first resource value of the unit of electric energy of the grid and a second resource value of the unit of electric energy of the grid. Herein, if the resource value is less than the first resource threshold and greater than the second resource threshold, it indicates that the grid is in the normal power consumption period.

In an example, the first resource value may be greater than the first resource threshold, that is, the first resource value is a resource value in the peak power consumption period, for example, the electricity price in the peak power consumption period, such as the peak price. The second resource value is less than the first resource threshold and greater than the second resource threshold, that is, the second resource value may be a resource value in the normal power consumption period, for example, the electricity price in the normal power consumption period, such as the normal price.

S372: determining a comparison result between the difference and a preset difference threshold. Herein, a first comparison result is that the difference is greater than or equal to a first preset difference threshold, it indicates that the difference between the resource value in the peak power consumption period and the resource value in the normal power consumption period is large. A second comparison result is that the difference is less than the first preset difference threshold, it indicates that the difference between the resource value in the peak power consumption period and the resource value in the normal power consumption period is small.

Herein, the first difference threshold may be set according to actual scenarios and specific demands, and its specific value is not limited.

S373: controlling the charging and discharging module to perform an electric energy transmission strategy corresponding to the comparison result, in which the electric energy transmission strategy is a transmission strategy of the electric energy between a battery in the battery swapping station and the grid. Herein, the transmission strategy may include one of the following schemes: transmitting electric energy from the battery in the battery swapping station to the grid, transmitting electric energy from the grid to the battery, and no electric energy transmission.

With the embodiment, the electric energy transmission scheme can be flexibly adjusted according to the difference between the resource value in the peak power consumption period and the resource value in the low power consumption period, which improves the flexibility of the electric energy transmission.

In an example, under a condition that the comparison result indicates that the difference is greater than or equal to the preset difference threshold, a first electric energy transmission strategy of transmitting electric energy from the battery in the battery swapping station to the grid is performed. That is, if the difference between the resource value in the peak power consumption period and the resource value in the normal power consumption period is too large, the power consumption load in the normal power consumption period is less than the power consumption load in the peak power consumption period, and the electric quantity of the grid in the normal power consumption period is sufficient. In such a case, for a reasonable electric energy scheduling, the electric energy of the grid may be transmitted to the battery in the battery sapping station.

The specific transmission manner may refer to the related content described in conjunction with FIG. 6, which will not be repeated.

In another example, under a condition that the difference between the resource value in the peak power consumption period and the resource value in the normal power consumption period is small, that is, under a condition that the comparison result indicates that the difference is less than the preset difference threshold, a second electric energy transmission strategy of stopping the electric energy transmission between the battery in the battery swapping station and the grid is performed. That is, the power consumption load in the normal power consumption period is slightly less than the power consumption load in the peak power consumption period, and the electric quantity of the grid in the normal power consumption period is not very sufficient. In such a case, for a reasonable electric energy scheduling, the electric energy of the battery may be transmitted to the grid.

Based on the same inventive concept, in addition to the method for electric energy transmission, the embodiments of the present application further provide a corresponding apparatus for electric energy transmission.

The apparatus for electric energy transmission according to the embodiments of the present application is described in detail below with reference to the drawings.

Figure 8:
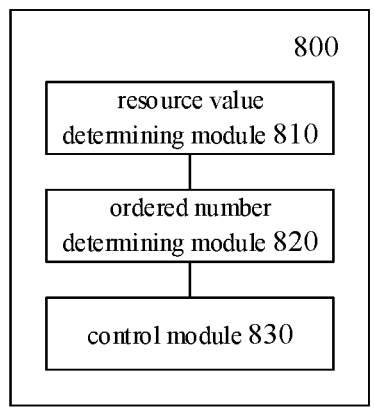
FIG. 8 shows a structural diagram of an apparatus for electric energy transmission provided by the embodiments of the present application.

FIG. 8 shows a structural diagram of an apparatus for electric energy transmission provided by the embodiments of the present application. As shown in FIG. 8, the apparatus 800 for electric energy transmission includes:

a resource value determining module 810 configured to determine a resource value of a unit of electric energy of a grid at a target time;

an ordered number determining module 820 configured to, under a condition that the resource value is greater than or equal to a first resource threshold, determine a number of available batteries in a battery swapping station and an ordered number of batteries in the battery swapping station within a target time period, in which the target time period is a time period between the target time and a time when the resource value falls below the first resource threshold; and a control module 830 configured to, under a condition that the number of available batteries is greater than a number of reserved batteries, control a charging and discharging module to transmit electric energy of a first battery in the battery swapping station to the grid, wherein the number of reserved batteries is greater than or equal to the ordered number, and the first battery comprises one or more of batteries other than the reserved batteries in the battery swapping station.

In some embodiments, the control module 830 is further configured to:

under a condition that the number of available batteries is less than the number of reserved batteries, control the charging and discharging module to transmit electric energy of the grid to a second battery other than the available batteries in the battery swapping station to modulate the second battery as an available battery by the electric energy of the grid, so that the number of available batteries after modulation is greater than the number of reserved batteries.

In some embodiments, the apparatus 800 for electric energy transmission further includes:

a request acquiring module configured to, under a condition that the number of available batteries is less than the number of reserved batteries, acquire a battery swapping request from a vehicle, in which the battery swapping request includes a number of batteries requested to be swapped within the target time period;

a time determining module configured to, under a condition that a number of remaining available batteries in the battery swapping station is less than the number of batteries requested to be swapped, determine a battery swapping time of the vehicle in response to the battery swapping request;

a number estimating module configured to estimate a number of available batteries at the battery swapping time according to a charging parameter of the battery swapping station; and the control module 830 is further configured to, under a condition that the estimated number of available batteries is less than the number of batteries requested to be swapped, control the charging and discharging module to transmit electric energy of the grid to a third battery in the battery swapping station to modulate the third battery as an available battery by the electric energy of the grid, so that the number of available batteries at the battery swapping time after modulation is greater than or equal to the number of batteries requested to be swapped.

In some embodiments, the number of reserved batteries is a product of the ordered number and a target ratio threshold;

the apparatus 800 for electric energy transmission further includes:
a category determining module configured to determine a category of the battery swapping station; and
a threshold determining module configured to determine a ratio corresponding to the category of the battery swapping station as the target ratio threshold.

In some embodiments, the category of the battery swapping station includes: a first category of battery swapping station or a second category of battery swapping station, in which a battery swapping frequency of the first category of battery swapping station is higher than a battery swapping frequency of the second category of battery swapping station; and
the first category of battery swapping station corresponds to a first ratio, the second category of battery swapping station corresponds to a second ratio, and the first ratio is greater than the second ratio.

In some embodiment, the control module 830 is further configured to:
under a condition that the resource value is less than or equal to a second resource threshold, control the charging and discharging module to transmit electric energy of the grid to a battery in the battery swapping station, the second resource threshold is less than the first resource threshold.

In some embodiments, the apparatus 800 for electric energy transmission further includes:
a difference determining module configured to, under a condition that the resource value is less than the first resource threshold and greater than a second resource threshold, determine a difference between a first resource value of the unit of electric energy of the grid and a second resource value of the unit of electric energy of the grid, in which the first resource value is greater than the first resource threshold, and the second resource value is less than the first resource threshold and greater than the second resource threshold;
a comparison result determining module configured to determine a comparison result between the difference and a preset difference threshold;
accordingly, the control module 830 is further configured to control the charging and discharging module to perform an electric energy transmission strategy corresponding to the comparison result, in which the electric energy transmission strategy is a transmission strategy of the electric energy between a battery in the battery swapping station and the grid.

In some embodiments, under a condition that the comparison result indicates that the difference is greater than or equal to the preset difference threshold, a first electric energy transmission strategy of transmitting electric energy from the battery in the battery swapping station to the grid is performed; and
under a condition that the comparison result indicates that the difference is less than the preset difference threshold, a second electric energy transmission strategy of stopping the electric energy transmission between the battery in the battery swapping station and the grid is performed.

With the apparatus for electric energy transmission of the embodiments of the present application, when the resource value of the unit of electric energy of the grid at the target time is greater than the first resource threshold, that is, when the power consumption load of the grid is high, under a condition that the number of available batteries is greater than the number of reserved batteries, that is, under a condition that the number of batteries in the battery swapping station that can be swapped to the vehicle in the target time period is sufficient, the electric energy of one or more first batteries other than the reserved batteries in the battery swapping station can be transmitted to the grid. Since the target time period is a time period between the target time and a time when the resource value falls to the first resource threshold, that is, the target time period can present a peak power consumption period after the target time, through transmitting the electric energy of the first battery to the grid, the battery swapping capability of the battery swapping station in the peak power consumption period is guaranteed, and moreover, the surplus electric energy of the battery swapping station can be supplemented to the grid, so that the electric energy of the batteries in the battery swapping station can be reasonably utilized when the power consumption load of the grid is high.

Other details of the apparatus for electric energy transmission of the embodiments of the present application are similar to the method for electric energy transmission as shown above in conjunction with FIGS. 3 to 7, and the corresponding technical effects can be achieved, which will not be repeated for simplicity.

Figure 9:
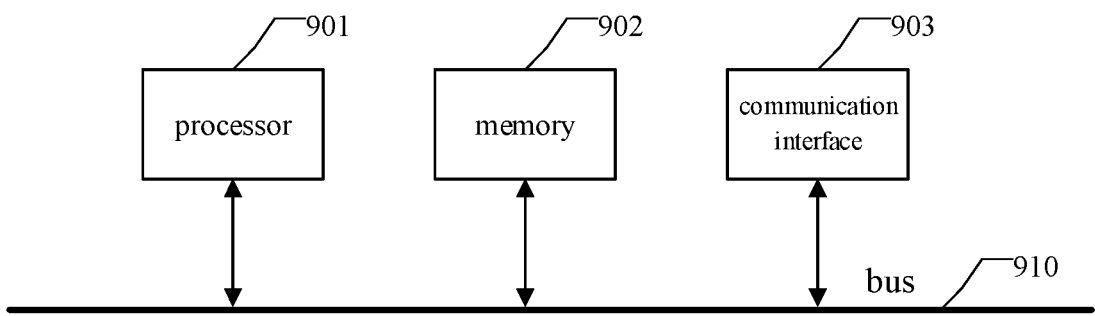
FIG. 9 shows a structural diagram of a hardware structure of a device for electric energy transmission provided by the embodiments of the present application.

FIG. 9 shows a structural diagram of a hardware structure of a device for electric energy transmission provided by the embodiments of the present application.

The device for electric energy transmission may include a processor 901 and a memory 902 storing computer program instructions.

Specifically, the above processor 901 may include a central processing unit (Central Processing Unit, CPU), an application specific integrated circuit (Application Specific Integrated Circuit, ASIC), or one or more integrated circuits that may be configured to implement the embodiments of the present application.

The memory 902 may include a mass memory for data or instructions. For example, rather than limitation, the memory 902 may include a hard disk drive (Hard Disk Drive, HDD), a floppy disk drive, a flash memory, an optical disk, a magneto-optical disk, a magnetic tape or a universal serial bus (Universal Serial Bus, USB) drive, or a combination of two or more thereof. In some examples, the memory 902 may include removable or non-removable (or fixed) media, or the memory 902 is a non-volatile solid-state memory. In some embodiments, the memory 902 may be internal or external to the device for electric energy transmission.

In some examples, the memory 902 may be a read only memory (Read Only Memory, ROM). In an example, the ROM may be a mask-programmed ROM, a programmable ROM (PROM), an erasable PROM (EPROM), an electrically erasable PROM (EEPROM), an electrically rewritable ROM (EAROM) or a flash memory, or a combination of two or more thereof.

The memory 902 may include a read-only memory (ROM), a random access memory (RAM), a magnetic disk storage media device, an optical storage media device, a flash memory device, an electrical, optical, or other physical/tangible memory storage device. Therefore, the memory generally includes one or more tangible (non-transitory) computer-readable storage media (e.g., memory devices) encoded with a software including computer-executable instructions, and when the software is executed (e.g., by one or more processors), it is operable to perform the operations described with reference to the method according to one aspect of the present application.

The processor 901 reads and executes the computer program instructions stored in the memory 902 to implement the methods/steps in the embodiments as shown in FIGS. 3 to 7, and achieves the corresponding technical effects of the methods/steps in the embodiments as shown in FIGS. 3 to 7, which will not be repeated for simplicity.

In an example, the device for electric energy transmission may further include a communication interface 903 and a bus 910. Herein, as shown in FIG. 9, the processor 901, the memory 902, and the communication interface 903 are connected and communicate with each other through the bus 910.

The communication interface 903 is mainly used to implement the communications among various modules, apparatuses, units and/or devices in the embodiments of the present application.

The bus 910 includes hardware, software, or both, and couples the components of the device for electric energy transmission to each other. For example, rather than limitation, the bus may include an accelerated graphics port (Accelerated Graphics Port, AGP) or other graphics bus, an extended industry standard architecture (Extended Industry Standard Architecture, EISA) bus, a front side bus (Front Side Bus, FSB), a hyper transport (Hyper Transport, HT) interconnection, an industry standard architecture (Industry Standard Architecture, ISA) bus, an infinite bandwidth interconnection, a low pin count (LPC) bus, a memory bus, a microchannel architecture (MCA) bus, a peripheral component interconnection (PCI) bus, a PCI-Express (PCI-X) bus, a serial advanced technology attachment (SATA) bus, a video electronics standards association local (VLB) bus, or other suitable buses, or a combination of two or more thereof. Where appropriate, the bus 910 may include one or more buses. Although the embodiments of the present application describe and illustrate specific buses, the present application contemplates any suitable bus or interconnection.

The device for electric energy transmission may perform the method for electric energy transmission of the embodiments of the present application, so as to implement the method and apparatus for electric energy transmission described in conjunction with FIGS. 3 to 8.

In addition, in combination with the method for electric energy transmission of the above embodiments, the embodiments of the present application may provide a computer storage medium. The computer storage medium stores computer program instructions thereon; the computer program instructions implement, when executed by a processor, the method for electric energy transmission of any one of the above embodiments.

It should be noted that the present application is not limited to the specific configurations and processes described above and shown in the drawings. For simplicity, a detailed descriptions of well-known methods are omitted herein. In the above embodiments, several specific steps are described and shown as examples. Nonetheless, the flow of the methods of the present application is not limited to the specific steps described and shown, and those skilled in the art can make various changes, modifications and additions, or change the order of the steps, after understanding the gist of the present application.

Functional blocks shown in the above structural diagrams may be implemented as hardware, software, firmware, or a combination thereof. When implemented in hardware, the functional block may be, for example, an electronic circuit, an application specific integrated circuit (Application Specific Integrated Circuit, ASIC), a suitable firmware, a plug-in, a function card and the like. When implemented in software, elements of the present disclosure may be programs or code segments used to perform the required tasks. The programs or code segments may be stored in a machine-readable medium or transmitted over a transmission medium or a communication link via data signals carried in carriers. The "machine-readable medium" may include any medium capable of storing or transmitting information. Examples of the machine-readable medium may include an electronic circuit, a semiconductor memory device, a ROM, a flash memory, an erasable ROM (EROM), a floppy disk, a CD-ROM, an optical disk, a hard disk, a fiber medium, a radio frequency (Radio Frequency, RF) link, and the like. The code segments may be downloaded via a computer network such as the Internet, an intranet.

It should also be noted that the exemplary embodiments described in the present application describe some methods or systems based on a series of steps or apparatuses. Nonetheless, the present application is not limited to the above order of steps, that is, the steps may be performed in the order described in the embodiments, or a different order from the order in the embodiments, or several steps may be performed simultaneously.

Various aspects of the present application have been described above with reference to the flowchart and/or block diagram of the method, apparatus, device, and computer program product according to the embodiments of the present application. It should be understood that each block in the flowchart and/or block diagram and a combination of blocks in the flowchart and/or block diagram can be implemented by computer program instructions. These computer program instructions may be provided to the processor of a general-purpose computer, a dedicated computer, or other programmable data processing devices to produce a machine, so that the execution of these instructions via the processor of the computer or other programmable data processing devices enables the implementation of the functions/actions specified in one or more blocks of the flowchart and/or block diagram. Such a processor may be, but not limited to, a general-purpose processor, a dedicated processor, a special application processor, or a field programmable logic circuit. It may also be understood that each block in the block diagram and/or flowchart and a combination of the blocks in the block diagram and/or flowchart may also be implemented by dedicated hardware that performs the specified function or action, or may be implemented by a combination of dedicated hardware and computer instructions.

The above are merely specific implementations of the present application, and those skilled in the art may explicitly appreciate that for convenience and conciseness of the descriptions, the specific working process of the above systems, modules and units may refer to corresponding processes in the forgoing method embodiments, which will not be repeated herein. It should be understood that the scope of protection of the present application is not limited thereto, and any of those skilled in the art can easily think of various equivalent modifications or substitutions within the technical scope disclosed in the present application, and these modifications or substitutions should be covered within the scope of protection of the present application.

What is claimed is:

1. A method for electric energy transmission, comprising:
   determining a resource value of a unit of electric energy of a grid at a target time, the resource value representing a load state of the grid;
   under a condition that the resource value is greater than or equal to a first resource threshold, that is under a condition that the grid is in a high-load state, determining a number of available batteries in a battery swapping station and an ordered number of batteries in the battery swapping station within a target time period, wherein the target time period is a time period from the target time to a time when the resource value falls below the first resource threshold; and under a condition that the number of available batteries in the battery swapping station is greater than a number of reserved batteries, controlling a charging and discharging module to transmit electric energy of a first battery in the battery swapping station to the grid, wherein the number of the reserved batteries is greater than or equal to the ordered number of batteries in the battery swapping station within the target time period, and the first battery comprises one or more of batteries other than the reserved batteries in the battery swapping station, after the determining the number of available batteries in the battery swapping station, the method further comprises:

under a condition that the number of available batteries in the battery swapping station is less than the number of the reserved batteries, acquiring a battery swapping request from a vehicle, the battery swapping request comprising a number of batteries requested to be swapped within the target time period;

under a condition that a number of remaining available batteries in the battery swapping station is less than the number of batteries requested to be swapped, determining a battery swapping time of the vehicle in response to the battery swapping request;

estimating a number of available batteries at the battery swapping time according to a charging parameter of the battery swapping station; and under a condition that the estimated number of available batteries at the battery swapping time is less than the number of batteries requested to be swapped, controlling the charging and discharging module to transmit electric energy of the grid to a second battery in the battery swapping station to modulate the second battery as an available battery by the electric energy of the grid, so that the number of available batteries at the battery swapping time after modulation is greater than or equal to the number of batteries requested to be swapped, wherein the second battery comprises one or more of batteries other than the available batteries in the battery swapping station.

2. The method of claim 1, wherein after the determining the number of available batteries in the battery swapping station and the ordered number of batteries in the battery swapping station within the target time period, the method further comprises:

under a condition that the number of available batteries in the battery swapping station is less than the number of the reserved batteries, controlling the charging and discharging module to transmit electric energy of the grid to a third battery other than the available batteries in the battery swapping station to modulate the third battery as an available battery by the electric energy of the grid, so that the number of available batteries in the battery swapping station after modulation is greater than the number of the reserved batteries.

3. The method of claim 1, wherein the number of the reserved batteries is a product of the ordered number of batteries in the battery swapping station within the target time period and a target ratio threshold;

before the controlling the charging and discharging module to transmit the electric energy of the first battery in the battery swapping station to the grid, the method further comprises:

determining a category of the battery swapping station; and determining a ratio corresponding to the category of the battery swapping station as the target ratio threshold.

4. The method of claim 3, wherein the category of the battery swapping station comprises: a first category of battery swapping station or a second category of battery swapping station, wherein a battery swapping frequency of the first category of battery swapping station is higher than a battery swapping frequency of the second category of battery swapping station; and the first category of battery swapping station corresponds to a first ratio, the second category of battery swapping station corresponds to a second ratio, and the first ratio is greater than the second ratio.

5. The method of claim 1, after the determining the resource value of the unit of electric energy of the grid at the target time, the method further comprises:

under a condition that the resource value is less than or equal to a second resource threshold, that is under a condition that the grid is in a low-load state, controlling the charging and discharging module to transmit electric energy of the grid to a battery in the battery swapping station, the second resource threshold being less than the first resource threshold.

6. The method of claim 1, after the determining the resource value of the unit of electric energy of the grid at the target time, the method further comprises:

under a condition that the resource value is less than the first resource threshold and greater than a second resource threshold, that is under a condition that the grid is in a normal-load state, determining a difference between a first resource value of the unit of electric energy of the grid and a second resource value of the unit of electric energy of the grid, wherein the first resource value is greater than the first resource threshold, and the second resource value is less than the first resource threshold and greater than the second resource threshold;

determining a comparison result between the difference and a preset difference threshold; and controlling the charging and discharging module to perform an electric energy transmission strategy corresponding to the comparison result, wherein the electric energy transmission strategy is a transmission strategy of the electric energy between a battery in the battery swapping station and the grid.

7. The method of claim 6, wherein under a condition that the comparison result indicates that the difference is greater than or equal to the preset difference threshold, performing a first electric energy transmission strategy of transmitting electric energy from the battery in the battery swapping station to the grid; and under a condition that the comparison result indicates that the difference is less than the preset difference threshold, performing a second electric energy transmission strategy of stopping the electric energy transmission between the battery in the battery swapping station and the grid.

8. A device for electric energy transmission, comprising:
a processor and a non-transitory memory storing computer program instructions;
  the processor reading and executing the computer program instructions to implement the method for electric energy transmission of claim 1.

9. A non-transitory computer storage medium storing computer program instructions thereon which implement, when executed by a processor, the method for electric energy transmission of claim 1.

10. An apparatus for electric energy transmission, comprising:
  a resource value determining module configured to determine a resource value of a unit of electric energy of a grid at a target time;
  an ordered number determining module configured to, under a condition that the resource value is greater than or equal to a first resource threshold, determine a number of available batteries in a battery swapping station and an ordered number of batteries in the battery swapping station within a target time period, wherein the target time period is a time period between the target time and a time when the resource value falls below the first resource threshold; and
  a control module configured to, under a condition that the number of available batteries in the battery swapping station is greater than a number of reserved batteries, control a charging and discharging module to transmit electric energy of a first battery in the battery swapping station to the grid,
  wherein the number of the reserved batteries is greater than or equal to the ordered number of batteries in the battery swapping station within the target time period, and the first battery comprises one or more of batteries other than the reserved batteries in the battery swapping station,
  the apparatus further comprises:
  a request acquiring module configured to, under a condition that the number of available batteries in the battery swapping station is less than the number of the reserved batteries, acquire a battery swapping request from a vehicle, the battery swapping request comprising a number of batteries requested to be swapped within the target time period;
  a time determining module configured to, under a condition that a number of remaining available batteries in the battery swapping station is less than the number of batteries requested to be swapped, determine a battery swapping time of the vehicle in response to the battery swapping request;
  a number estimating module configured to estimate a number of available batteries at the battery swapping time according to a charging parameter of the battery swapping station; and
  the control module is further configured to, under a condition that the estimated number of available batteries at the battery swapping time is less than the number of batteries requested to be swapped, control the charging and discharging module to transmit electric energy of the grid to a second battery in the battery swapping station to modulate the second battery as an available battery by the electric energy of the grid, so that the number of available batteries at the battery swapping time after modulation is greater than or equal to the number of batteries requested to be swapped, wherein the second battery comprises one or more of batteries other than the available batteries in the battery swapping station.

* * * * *